US008254608B2

(12) United States Patent
De Finis et al.

(10) Patent No.: US 8,254,608 B2
(45) Date of Patent: Aug. 28, 2012

(54) HEARING AID DEVICE AND METHOD OF PRODUCING A HEARING AID DEVICE

(75) Inventors: James Edward De Finis, Flanders, NJ (US); Jens-Christian Holst, Berlin (DE); Harald Klemenz, Fürth (DE); Lavlesh Lamba, Piscataway, NJ (US); Pei Chyi Kristy Lim, Singapore (SG); Uwe Rass, Nürnberg (DE); Joseph Sauer, Strullendorf (DE); Amit Vaze, Parlin, NJ (US)

(73) Assignee: Siemens Medical Instruments Pte. Ltd., Singapore (SG)

( * ) Notice: Subject to any disclaimer, the term of this patent is extended or adjusted under 35 U.S.C. 154(b) by 368 days.

(21) Appl. No.: 12/549,532

(22) Filed: Aug. 28, 2009

(65) Prior Publication Data

US 2011/0051966 A1 Mar. 3, 2011

(51) Int. Cl.
*H04R 25/00* (2006.01)
*H04R 31/00* (2006.01)
(52) U.S. Cl. .................................. 381/322; 381/328
(58) Field of Classification Search .................. 381/322, 381/324, 328; 600/431; 428/119
See application file for complete search history.

(56) References Cited

U.S. PATENT DOCUMENTS

| 4,199,637 | A | * | 4/1980 | Sado .............................. 428/119 |
| 5,265,168 | A | * | 11/1993 | Schiess et al. ................ 381/324 |
| 5,404,408 | A | | 4/1995 | Strohmaier et al. |
| 6,532,295 | B1 | * | 3/2003 | Brimhall et al. .............. 381/328 |
| 6,546,109 | B1 | * | 4/2003 | Gnecco et al. ................ 381/322 |
| 6,768,654 | B2 | * | 7/2004 | Arnold et al. ................. 361/818 |
| 6,843,690 | B2 | | 1/2005 | Sauer |
| 2007/0055147 | A1 | * | 3/2007 | Dalzell et al. ................. 600/431 |

FOREIGN PATENT DOCUMENTS

| DE | 3639402 A1 | 5/1988 |
| EP | 1317163 A2 | 6/2003 |
| EP | 2040343 A1 | 3/2009 |

* cited by examiner

*Primary Examiner* — Yuwen Pan
*Assistant Examiner* — Phan Le (57) ABSTRACT

The invention relates to a hearing aid device and a method for manufacturing the hearing aid device. The hearing aid device comprises a housing having an inner surface. The housing has an electrical component therein. A conductive layer is attached on at least a portion of the inner surface of the housing. The inner surface acts as a support for the conductive layer. The electrical component is conductively connected to the conductive layer.

11 Claims, 9 Drawing Sheets

HEARING AID DEVICE AND METHOD OF PRODUCING A HEARING AID DEVICE

FIELD OF THE INVENTION

The present invention relates to a hearing aid device and a method for manufacturing the hearing aid device.

BACKGROUND OF THE INVENTION

Hearing aid devices and hearing devices generally comprise a housing, in which a microphone, an amplifier or amplifying device, a receiver, a power supply, mostly a zinc-air battery inter alia are arranged. The receiver is connected to an acoustic output of the housing, which emits the acoustic signals generated and prepared by the hearing aid device into an auditory canal of a wearer of the hearing aid device.

In order to meet the aesthetic requirements of a wearer of the hearing aid device, this is to be as minimally externally visible on the wearer as possible. These requirements are particularly high especially in the case of hearing devices worn in the ear, referred to hereafter as in-ear hearing aid device. The components needed for an in-ear hearing aid device are thus to be designed as small as possible within the in-ear hearing aid device, to be packed as tightly as possible and to be reduced to a minimum.

SUMMARY OF THE INVENTION

It is an object of the invention to miniaturize the hearing aid device.

The above object is achieved by a hearing aid device comprising a housing having an inner surface, the housing having an electrical component therein, a conductive layer attached on at least a portion of the inner surface of the housing, the inner surface acting as a support for the conductive layer and wherein the electrical component is conductively connected to the conductive layer.

The conductive layer is attached onto the inner surface of the housing of the hearing aid device to make connections. This enables in miniaturization of the hearing aid device. Additionally, the requirement of loose wires leads may be reduced and thus the electromagnetic interference within the housing of the hearing aid device is reduced. Additionally, reduction in the number of soldering points is achieved. In some aspects, the use of conductive layers, enable suspending an electrical component and thus eliminating the requirement of soldering.

According to an embodiment, the conductive layer is attached using a solid freeform fabrication technique selected from the group consisting of inkjet printing, pneumatic spraying, screen printing, pad printing, laser printing, dot matrix printing, thermal printing, lithography, and 3D printing. Fabricating or printing the conductive layer using a solid freeform fabrication technique enables in fabricating the conductive layer onto the inner surface of the housing concurrently at the time of manufacturing the housing.

According to another embodiment, the conductive layer is a conductive pathway. The conductive pathway enables an electrical component to be conductively connected to it and an electrical connection may be made to the electrical component using the conductive pathways.

According to yet another embodiment, the conductive layer extends over the entire surface of the inner surface. The conductive layer extending over the entire surface of the inner surface provides the advantage such that an electrical component can be conductively connected to the conductive layer irrespective of the position of the electrical component. Advantageously, power supply to the components may be provided via the conductive layer.

According to yet another embodiment, the hearing aid device further comprises a non-conductive layer attached over the conductive layer. Attaching a non-conductive layer over the conductive layer enables attaching multiple conductive layers.

According to yet another embodiment, the hearing aid device further comprises an insulating medium between two conductive layers to separate the two conductive layers. The insulating medium enables separating the conductive layers to fond positive and negative contacts. Additionally, the insulating medium may also enable separating the conductive layers for different connections.

According to yet another embodiment, the insulating medium is a portion of the inner surface of the housing. The portion of the inner surface of the housing can be used as the insulating medium as the housing is generally manufactured using a non-conductive material. Moreover, using the portion of the housing as the insulating medium eliminates the requirement of printing additional insulating layers.

According to yet another embodiment, the insulating medium is an insulating layer. The insulating layer enables separating multiple conductive layers.

According to yet another embodiment, the electrical component is connected to the conductive layer using one or more from the group consisting of a connector lead, and a soft ring. Connecting the electrical component to the conductive layer using a connector lead or a soft ring enables suspending the electrical component rigidly. Moreover, this eliminates the requirement of soldering and thus reduces the manufacturing time of the hearing aid device. Additionally, the hearing aid device may be easily repaired as the defective electrical component may be replaced easily.

According to yet another embodiment, the electrical component is conductively connected to another electrical component via the conductive layer. Connecting the electrical component to another electrical component via the conductive layer eliminates the requirement of using loose wire leads to connect the electrical component to another electrical component.

According to yet another embodiment, wherein the electrical component is fixedly positioned over the conductive layer. Positioning fixedly the electrical component over the conductive layer enables miniaturization of the hearing aid device. Additionally, this reduces the number of loose wire leads required for connecting the electrical component.

According to yet another embodiment, the conductive layer extends on an outer surface of a casing of the electrical component to conductively connect to a connection pad on the outer surface of the casing. Extending the conductive layer onto the outer surface of the casing of the electrical component enables connecting the electrical component to the conductive layer by printing the conductive layers on the outer surface of the casing of the electrical component. Additionally, this eliminates the requirement of using loose wire leads to make connections within the hearing aid device.

According to yet another embodiment, the electrical component comprises a casing, at least a section of the casing comprises a conductive outer surface, the conductive outer surface making a contact with the conductive layer. The conductive outer surface of the casing enables conductively connecting the electrical component to the conductive layer.

According to yet another embodiment, the housing comprises a slot onto an inner side to receive the electrical component. The slot enables positioning the electrical component onto the conductive layer.

Another embodiment includes, a method of producing a hearing aid device, wherein the method comprises attaching a conductive layer onto at least a portion of an inner surface of a housing of the hearing aid device, the inner surface acting as a support for the conductive layer and connecting conductively an electrical component disposed within the housing to the conductive layer.

BRIEF DESCRIPTION OF THE DRAWINGS

The method may be used to manufacture the hearing aid device according to any of the embodiments described herein and described in detail with respect to the drawings.

The present invention is further described hereinafter with reference to illustrated embodiments shown in the accompanying drawings, in which:

FIG. 8b is an enlarged side view of the encircled area of FIG. 8a, FIG. 9a illustrates connection between two electrical components using conductive layers attached onto an inner surface of a housing of a hearing aid device and extended onto an outer surface of a casing of electrical component.

DETAILED DESCRIPTION OF THE INVENTION

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1:
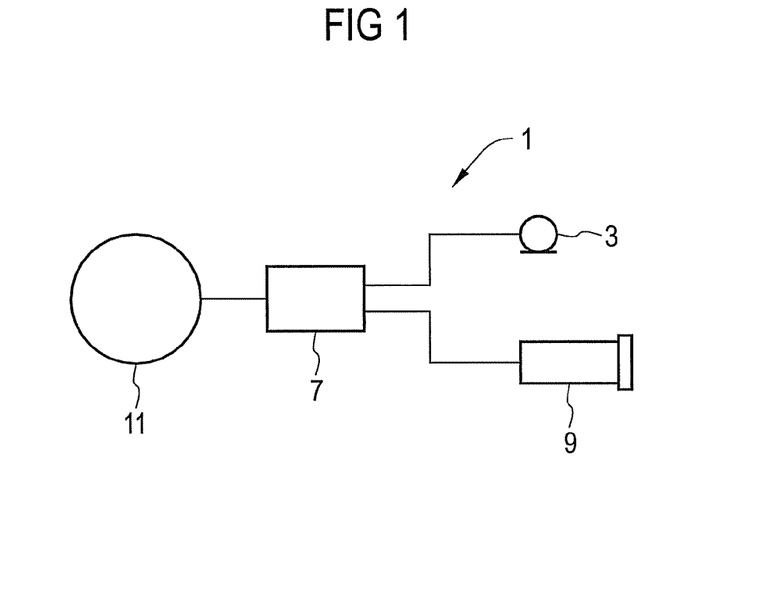
FIG. 1 illustrates a schematic block diagram of a hearing aid device.
Figure 2A:
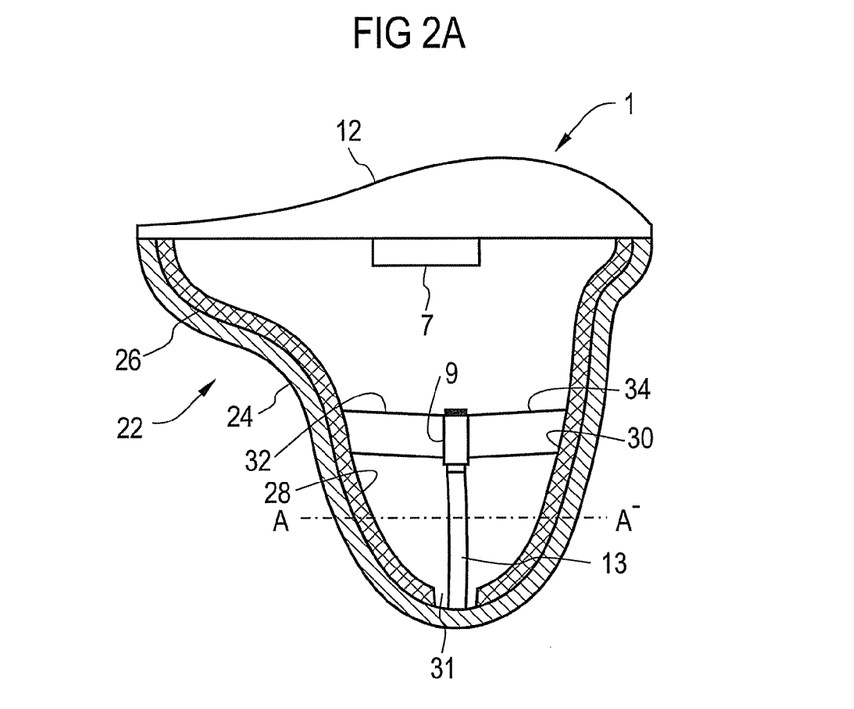
FIG. 2a illustrates a hearing aid device according to an embodiment herein.

Referring to FIGS. 1 through 2a, a hearing aid device 1 comprises therein a plurality of electrical components essential for a hearing aid function, such as a microphone 3, an amplifier 7, a receiver 9 and a power source 11. The electrical component may also include resistors, capacitors, coils and the like. The electrical components such as the resistor, capacitor or the coil may be printed using solid freeform fabrication techniques, such as a 3D printing technique. A face plate 12 is provided at the distal end of the hearing aid device 1. Typically, the amplifier 7 is mounted onto the face plate 12. In an implementation, the face plate 12 and the amplifier 7 may also be printed using the solid freeform techniques. The hearing aid device 1 records ambient noise with the aid of the microphone 3, amplifies these by means of the amplifier 7 and forwards them to the receiver 9. The power supply required for the amplifier 7 for amplification s provided by the power source 11. A sound outlet canal 13 at the proximal end of the hearing aid device 1 conveys the sound signals of the receiver 9 into the auditory canal and thus to the ear drum of a wearer of the hearing aid device 1. Connection to one or more of the electrical components may be made using one or more conductive layers 28, 30 attached onto an inner surface 26 of a housing 22 of the hearing aid device 1.

FIG. 2a illustrates an example of a hearing aid device 1 according to an embodiment herein. The hearing aid device 1 illustrated in the present example is an in ear hearing aid device. However, the hearing aid device 1 may be another kind of hearing aid devices, such as, baby worn hearing aid device, behind the ear (BTE) hearing aid device, receiver in the canal (RIC) or ear hearing aid device, in the canal (ITC) hearing aid device, mini canal (MIC) hearing aid device, completely in the canal (CIC) hearing aid device, extended wear hearing aid device, open fit hearing aid devices, eye glass hearing aid devices and the like.

The hearing aid device 1, generally comprises a housing 22. The housing 22 comprises therein the electrical components essential for the functioning of the hearing aid device 1. In the shown example of FIG. 2a, the housing 22 comprises an outer surface 24 and an inner surface 26. In an aspect herein, one or more conductive layers 28, 30 may be attached onto the inner surface 26 of the housing 22. The inner surface 26 of the housing acts as a support for the conductive layers 28, 30. Advantageously, the housing 22 is manufactured using a non-conductive material, for example a resin. The housing 22 may also be manufactured using a conductive material. However, if the housing 22 is manufactured using a conductive material, the conductive layers 28, 30 are to be insulated from the layers of the housing 22 using insulating mediums. Alternatively, the housing 22 may be manufactured using a conductive material and then a non-conductive material may be coated onto the housing. This enables having a conductive layer attached onto an inner surface of the non-conductive layer of the housing 22. In the shown example of FIG. 2a, conductive layers 28, 30 may represent a positive contact and a negative contact. However, only a single conductive layer may be attached onto the inner surface 26 of the housing 22. If a single conductive layer is attached, the conductive layer may represent either a positive contact or a negative contact. If multiple conductive layers are attached, the multiple conductive layers may be connected to the electrical components. This enables in increasing the fault tolerance of the hearing aid device 1 as redundant connections can be made.

The use of a conductive layer attached onto the inner surface of the housing of the hearing aid device to make connections, enable in miniaturization of the hearing aid device. Additionally, the requirement of loose wires leads may be reduced and thus the electromagnetic interference within the housing of the hearing aid device is reduced. Additionally, reduction in the number of soldering points is achieved. In some aspects, the use of conductive layers, enable suspending an electrical component and thus eliminating the requirement of soldering.

In the shown example of FIG. 2a, the conductive layers 28, 30 extend from the distal end to the proximal end of the housing 22. However, the conductive layers 28, 30 may be attached onto a portion of the inner surface 26 and may not extend from the distal end to the proximal end of the housing 22. If the conductive layers 28, 30 do not run from the proximal end to the distal end, it may be required that the conductive layers 28, 30 are to be attached onto the inner surface 26 of the housing 22 such that the position of the conductive layers 28, is suitable for making connections with electrical components. If a single conductive layer is attached onto the inner surface 26 of the housing 22, the conductive layer may extend over a substantial area of the inner surface 26 of the housing. However, the conductive layer can also extend over a portion or region of the surface of the inner surface 26 of the housing 22. The attachment of the conductive layer 28, 29 onto the inner surface 26 of the housing is described in more detail in FIGS. 3 and 4 below.

As illustrated in the example of FIG. 2a, the conductive layers 28, 30 are separated by an insulating medium 31 to form the positive and negative contacts. The insulating medium 31 may be a non-conducting layer of the inner surface 26 of the housing 22 or an insulating layer attached between the conductive layers 28, 30.

Figure 2B:
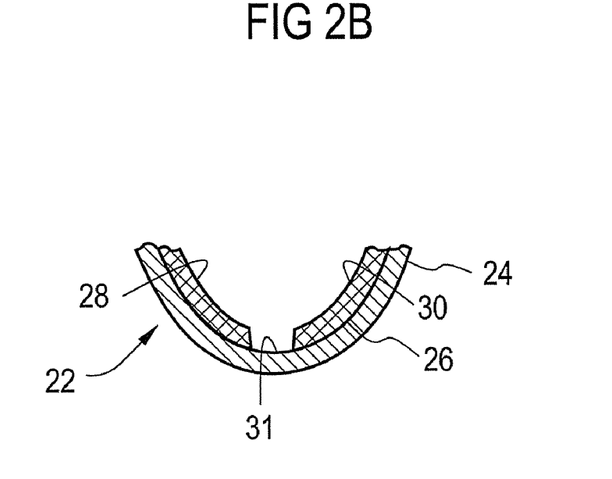
FIG. 2b illustrates a cross sectional view of the hearing aid device 1 according to the line A-A' of FIG. 2a, FIG. 2c illustrates an insulating medium provided to act a as barrier between two conductive layers.

FIG. 2b illustrates a cross sectional view of the hearing aid device 1 according to the line A-A' of FIG. 2a. In the example of FIG. 2b, it is shown that the conductive layers 28, 30 attached onto the inner surface 26 of the housing 22 are separated by the insulating medium 31. In the example of FIG. 2b, the insulating medium is the non-conducting layer of the housing 22.

Figure 2C:
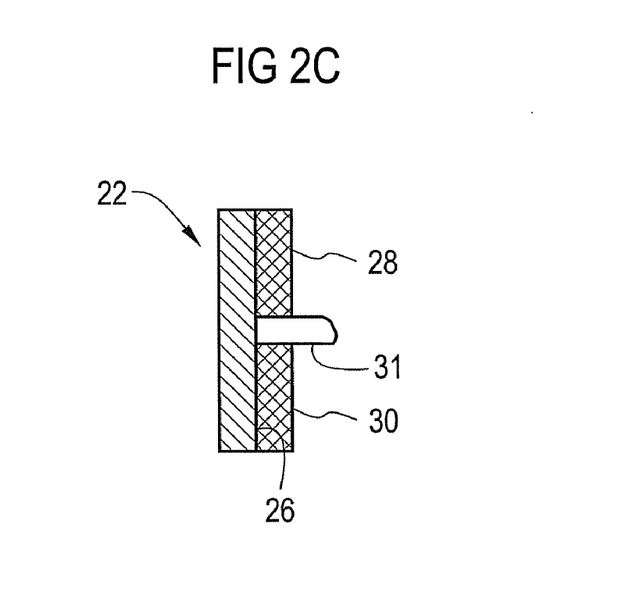

The insulating medium 31 may be an insulating layer, such as the layer of the inner surface 26 of the housing 22 as generally the housing is made of a non-conducting material. In certain embodiments, the insulating medium 31 may be an insulating layer such that the insulating layer acts as a barrier between two conductive layers 28, 30 as illustrated in FIG. 2c.

Figure 3:
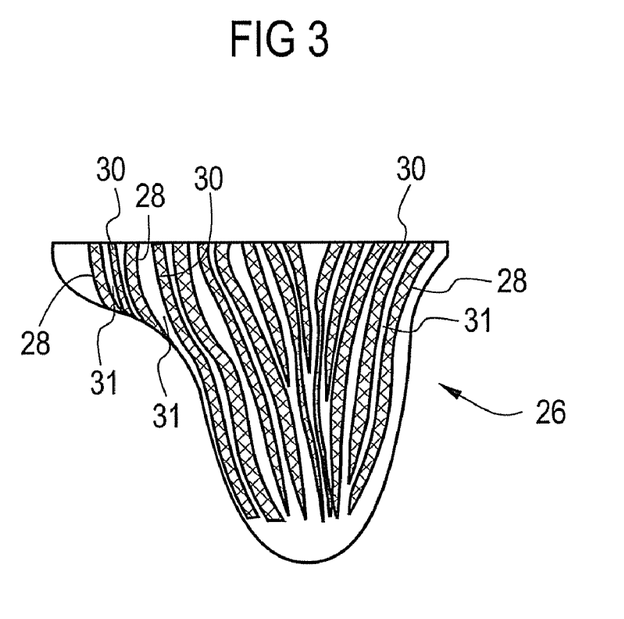
FIG. 3 illustrates a pattern of attaching conductive layers on an inner surface of a housing of a hearing aid device according to an embodiment herein.

FIG. 3 illustrates a pattern of attaching conductive layers on the inner surface of the housing of the hearing aid device according to an embodiment herein. In the shown example of FIG. 3, a plurality of conductive layers 28, 30 are attached on the inner surface 26 of the housing 22 in a stripe pattern. For example, one of the conductive layers may represent a positive contact and the other may represent a negative contact. For example, the conductive layers 28 may represent a positive contact and the conductive layers 30 may represent a negative contact. The conductive layers 28 are separated from the conductive layers 30 by an insulating medium 31. The insulating medium 31 in the present embodiment is portions of the inner surface 26 of the housing 22 on which no conductive layers 28, 30 are attached.

Figure 4:
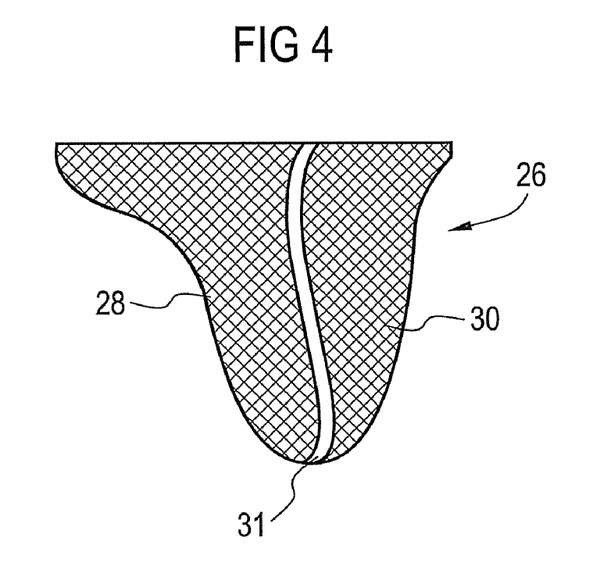
FIG. 4 illustrates another pattern of attaching conductive layers on an inner surface of a housing of a hearing aid device according to an embodiment herein.

FIG. 4 illustrates another pattern of attaching conductive layers on the inner surface of the housing of the hearing aid device according to an embodiment herein. In the shown example of FIG. 4, the conductive layer 28 is attached on one half of the inner surface 26 of FIG. 2a of the housing 22 of FIG. 2a and the conductive layer 30 is attached onto the other half of the inner surface of the housing 22. The conductive layer 28 is separated from the conductive layer 30 by an insulating medium 31. The insulating medium 31 in the present embodiment is portion of the inner surface 26 of the housing 22 on which no conductive layer are attached.

Referring again to FIG. 2a, an electrical component, for example a receiver 9 may be connected to the conductive layers 28, 30 using connector leads 32, 34. The receiver 9 illustrated in FIG. 2a is shown as an example and other electrical components may also be connected in a similar manner. Other connector means, such as soft rings and the like may also be used to connect an electrical component to the conductive layers 28, 30. The connector leads 32, 34 may pierce into the respective conductive layers 28, 30. The connector leads 32, 34 enable suspending the receiver 9 rigidly and thus, reduce shocks and vibrations encountered by the receiver due to the movement of the user of the hearing aid device. Additionally, the use of connector leads 32, 34 enable to eliminate the requirement of soldering and thus, make the manufacturing process easy and less time consuming.

Figure 5:
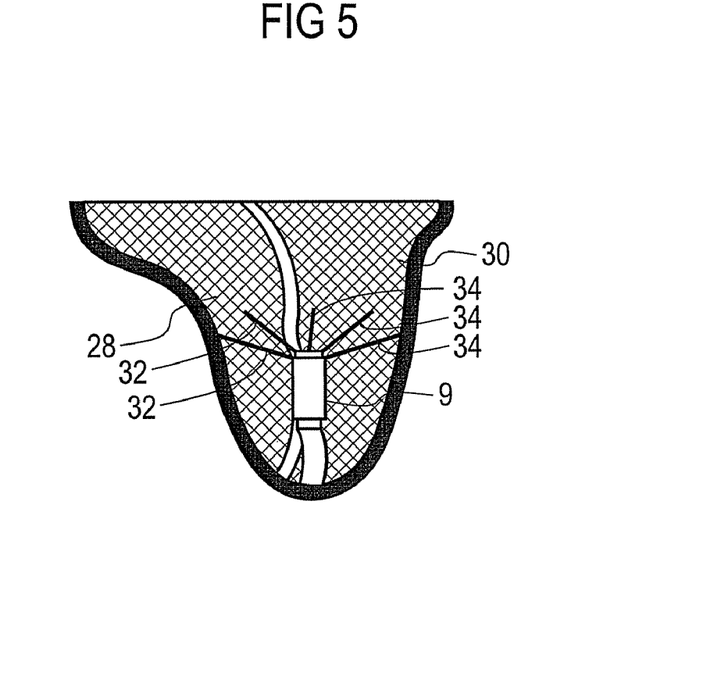
FIG. 5 illustrates connection between an electrical component and conductive layers attached onto an inner surface of a housing connector leads in more detail.

In an embodiment, multiple connections from the conductive layers 28, 30 to the electrical component may be made to increase fault tolerance. For example, a plurality of connector leads 32, 34 may be used to make the connections between the conductive layers 28, 30 and the electrical component FIG. 5 illustrates connection between an electrical component and conductive layers attached onto the inner surface of the housing connector leads in more detail. In the shown example of FIG. 5, a receiver 9 is connected to the conductive layers 28, 30 using connector leads 32, 34. The connector leads 32, 34 may pierce into the conductive layers 28, 30. The connector leads 32, 34 connect to a connection pad and the connection pad in turn connects to the contact terminal of the receiver 9. In the shown example of FIG. 5, the receiver 9 is held in a suspended position rigidly and thus reduces the chances of device failure due to shock and vibration. The multiple connector leads 32, 34 enables in increasing fault tolerance of the hearing aid device 1 of FIG. 2a.

Figure 6:
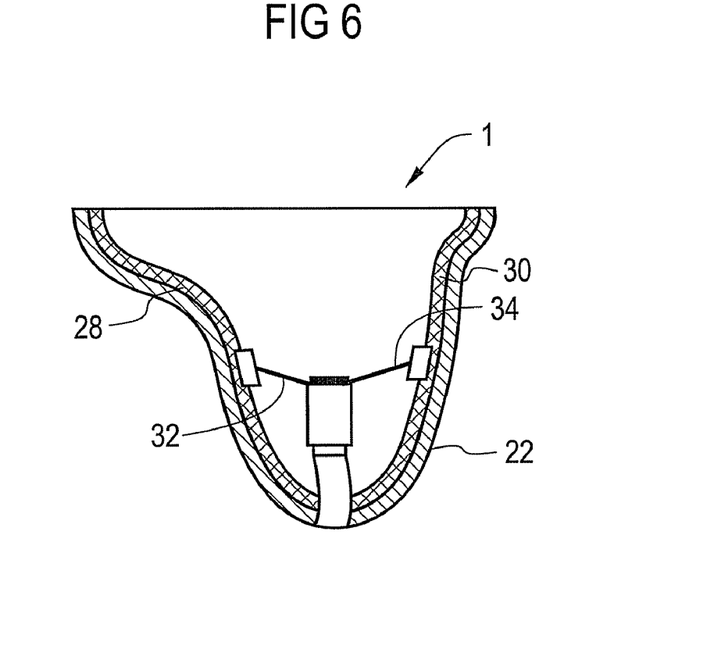
FIG. 6 illustrates connection between an electrical component and conductive layers using connection leads attached onto an inner surface of a housing according to an embodiment herein.

Referring again to FIG. 2a, in an alternative implementation, the housing 22 may be manufactured such that connector terminals or leads 32, 34 are attached to the housing 22. The receiver 9 may be connected to the connector leads or terminal 32, 34 and thus connect to the conductive layers 28, 30. FIG. 6 illustrates connection between an electrical component and conductive layers using connection leads attached onto the inner surface of the housing. The receiver 9 is connected to the conductive layers 28, 30 using connector leads 32, 34. The connector leads 32, 34 are attached to the housing of the hearing aid device 1 and are conductively connected to the conductive layers 28, 30. The connector leads 32, 34 may be attached to the housing 22 during fabrication of the housing 22.

Figure 7A:
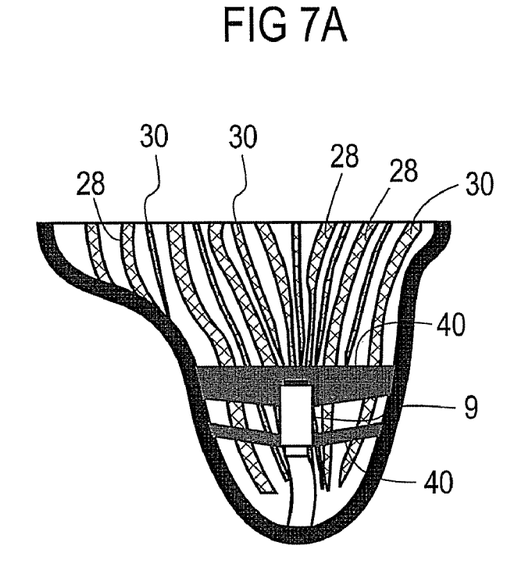
FIG. 7a illustrates connection between an electrical component and conductive layers attached onto an inner surface of a housing of a hearing aid device using soft rings.
Figure 7B:
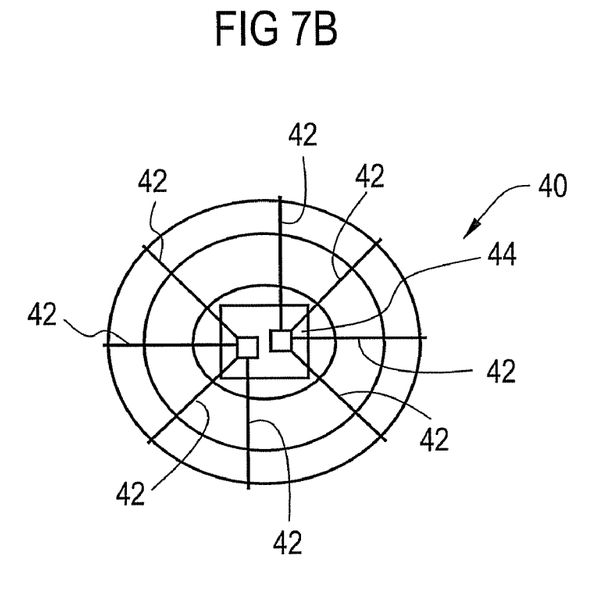
FIG. 7b illustrates a soft ring in detail.

Referring now to FIG. 2a and FIGS. 7a through 7b, in another implementation soft ring 40 may be used to connect the receiver 9 to the conductive layers 28, 30 and also to suspend the receiver 9 rigidly. FIG. 7a illustrates connection between an electrical component and conductive layers attached onto the inner surface of the housing of the hearing aid device using soft rings. In the shown example of FIG. 7a, a receiver 9 is connected to the conductive layers 28, 30 using soft rings 40. FIG. 7b illustrates a soft ring 40 in detail. The soft ring 40 comprises conductive medium 42 which are connected to the conductive layers 28, 30 of FIG. 7a. The conductive mediums 42 connect to a connection pad 44 on the soft ring 42 and the connection pad 44 connects to the contact terminal of the receiver 9 of FIG. 7a. The multiple conductive mediums 42 enable multiple connections between the receiver 9 and the conductive layers 28, 30. This increases the fault tolerance of the hearing aid device 1 as redundant connections may be made to an electrical component. In the shown example of FIG. 7a, the receiver 9 is held in a suspended position rigidly and thus reduces the chances of device failure due to shock and vibration.

Referring again to FIG. 2a, another electrical component, for example, an amplifier 7 may be connected to the conductive layers 28, 30 using connector leads 36, 38. Soft rings 40 of FIG. 6a and FIG. 6b may also be used to connect the amplifier 7 to the conductive layers 28, 30. Thus, connecting the receiver 9 and the amplifier 7 to the conductive layers 28, 30 enable conductively connecting the receiver 9 to the amplifier 7 without the requirement of loose wire leads. Moreover, the connector leads 32, 34 hold the receiver 9 in a suspended position which is rigid and reduce shocks and vibrations encountered by the receiver 9 due to the movement of the user of the hearing aid device. Suspending the receiver 9 inside the housing 22 eliminates the need of extra caution to be taken while the hearing aid device is being manufactured. Alternatively, the manufacturing time for the hearing aid device 1 is reduced.

Preferably, the conductive layers 28, 30 are attached onto the inner surface 26 of the housing 22 by fabricating the housing 22 and the conductive layers 28, 30. While fabricating the housing 22, the conductive layers 28, 30 may be fabricated onto the inner surface 26 of the housing 22. In certain implementation additional layers of the housing may be fabricated onto the inner surface 26 to which the conductive layers 28, 30 are fabricated. Additional layers of the housing may be fabricated for fabricating multiple layers of conductive layers or for providing insulation as the housing is manufactured using a non-conducting material.

Figure 8A:
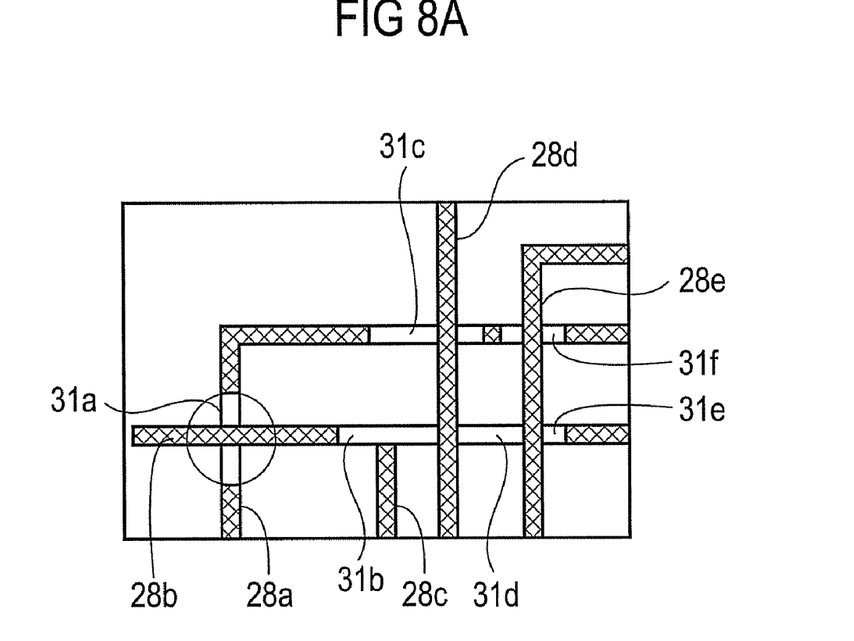
FIG. 8a illustrates separation of a plurality of conductive layers using insulating mediums.
Figure 8B:
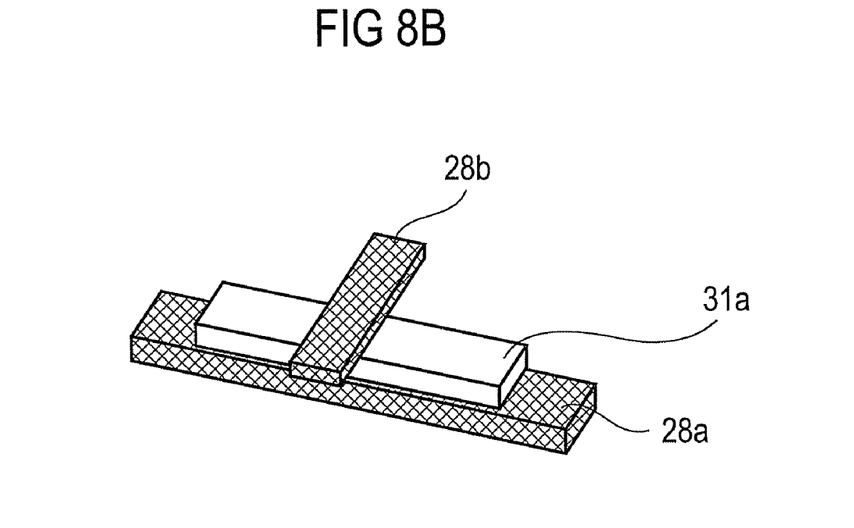

Multiple conductive layers one above the other may also be provided. Advantageously, one conductive layer may be separated from another by an insulating medium. Alternatively an insulating layer may be attached onto the inner surface 26 of the housing 22 to separate two conductive layers. In an example, if the conductive layers are conductive pathways, the point of intersection of two conductive layers may be separated by having an insulating layer therein. FIG. 8a illustrates separation of a plurality of conductive layers using insulating mediums. A plurality of conductive layers 28a through 28e separated from each other using insulating mediums 31a through 31f respectively. In the example of FIG. 8b, an enlarged side view of the encircled area of FIG. 8a is shown. It is seen that the conductive layers 28a and 28b are separated by the insulating medium 31a. The insulating medium 31a enables to prevent conduction between the conductive layers 28a and 28b. Thus, multiple conductive layers may be printed by having respective insulating mediums between them.

Referring now to FIG. 8a and FIG. 8b, in an implementation the conductive layers 28a through 28e may be filaments and the point of intersections can be separated by having insulating mediums 31a through 31f therein.

Figure 9A:
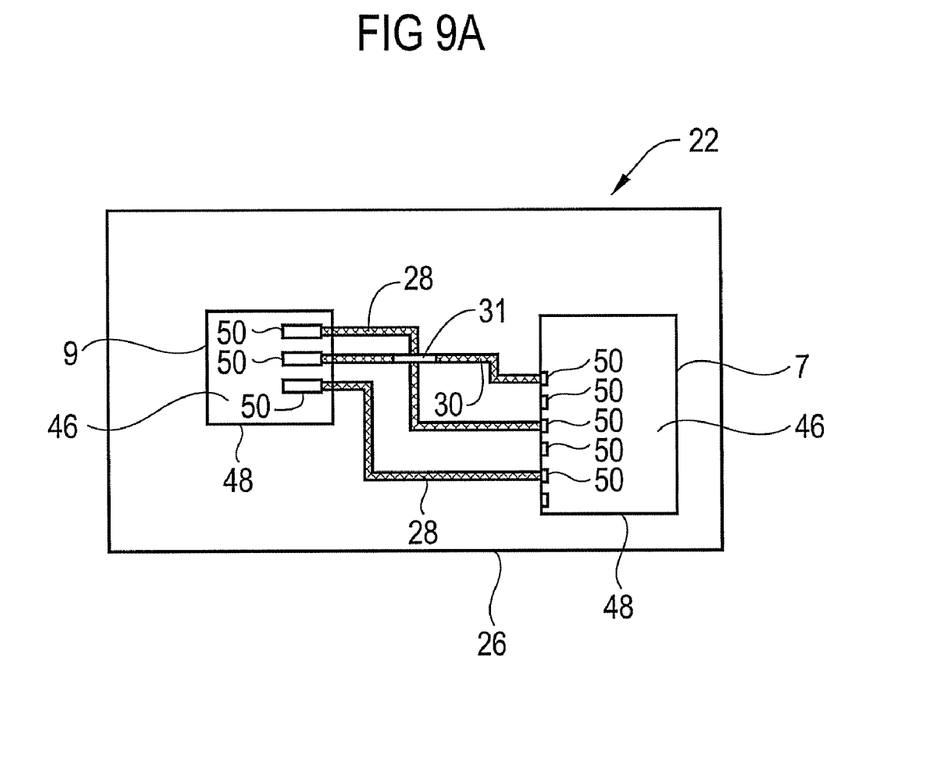

In another embodiment, the electrical components may be fixedly positioned onto the inner surface comprising the conductive layers. The conductive layers may be extended onto the outer surface of a casing of the electrical component and thus complete the connection. FIG. 9a illustrates connection between two electrical components using the conductive layers attached onto the inner surface of the housing of the hearing aid device and extended onto an the outer surface of the casing. In the shown example of FIG. 9a, electrical components, for example, a receiver 9 and an amplifier 9 may be held fixedly onto the inner surface 26 of the housing 22. The conductive layers 28, 30 may be printed onto the inner surface 26 of the housing 22 and onto the outer surface 46 of the casing 48 of the receiver 9 and the amplifier 7 to connect the receiver 9 and the amplifier 7. In the present example, the inner surface 26 of the housing 22 and the outer surface 46 of the casing 48 acts as a support for the conductive layer. Alternatively, the conductive layers 28, 30 may be conductively connected to a single electrical component to provide power to the electrical component. The conductive layers 28, printed onto the outer surface 46 of the casing 48 make contact with connection pads 50 to connect the receiver 9 to the conductive layers 28, 30. An insulating medium 31 may be provided between the conductive layers 28, 30 for separating the conductive layers 28, 30. Preferably, the insulating medium 31 is provided at the point of intersection of the conductive layers 28, 30. However, the insulating medium 31 may be provided over the entire surface also. Preferably, in the present embodiment, the conductive layers 28, 30 are conductive pathways printed onto the inner surface 26 of the housing 22 and the outer surface 46 of the casing 48 of the receiver 9.

Figure 9B:
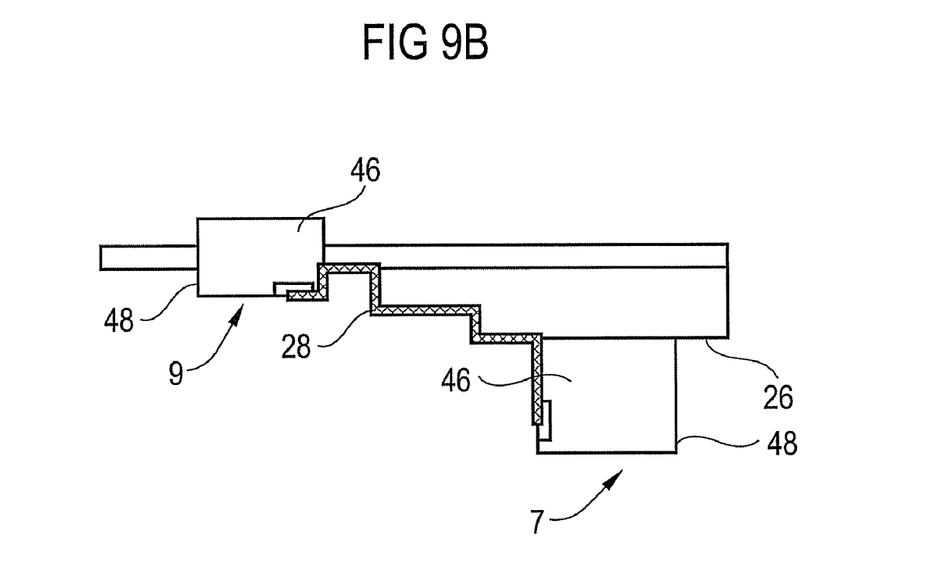
FIG. 9b illustrates a side view of the connection between the electrical components using the conductive layers of FIG. 9a, FIG. 10 illustrates connection between an electrical component and a conductive layer using a casing of the electrical component.

FIG. 9b illustrates a side view of the connection between the electrical components using the conductive layers of FIG. 9a. In the example of FIG. 9b, only the conductive layer 28 is illustrated for understanding purposes. It is seen that the conductive layer 28 is printed onto the inner surface 26 and over the outer surface 46 of the casing 48 of the amplifier 7 and the receiver 9. The present embodiment provides the advantage of connecting an electrical component to the conductive layers 28, 30 by printing the conductive layers 28, 30 on the outer surface 46 of the casing 48 of the electrical component.

Figure 10:
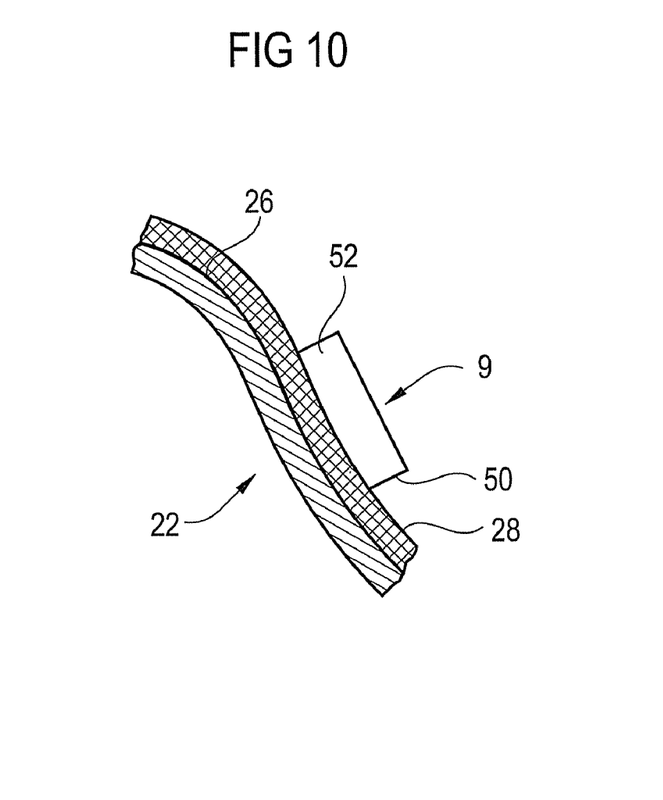

FIG. 10 illustrates connection between an electrical component and a conductive layer using a casing of the electrical component. Preferably, the conductive layer 28 extends over a substantial surface area of the inner surface 26 of the housing 22 and the inner surface 26 acting as a support for the conductive layer 28. However, the conductive layer 28 may extend over only a particular portion or region of the inner surface 26 of the housing 22. In the present example, the conductive layer 28 may be adapted to operate either as a positive contact or a negative contact. The electrical component, for example the receiver 9 comprises a casing 50 having a conductive outer surface 52. The receiver 9 is fixedly positioned onto the conductive layer 28 attached onto the inner surface 26 such that the outer surface 52 of the casing 50 of the receiver 9 is in contact with the conductive layer 28. The receiver 9 is shown for the purposes of illustration only and other electrical components may also be positioned onto the conductive layer 28. Internally, the outer surface 52 of the casing 50 may be connected to a connection point so that the outer surface 52 of the casing 50 is connected to the internal circuitry of the electrical component, i.e., the receiver 9. In an alternative embodiment, the casing 50 may be made using a conductive material such that the outer surface 52 and an inner surface of the casing 50 are conductive. In an implementation, only a portion of the outer surface 52 of the casing 50 may be conductive. If only a portion of the outer surface 52 of the casing 50 is conductive, it may be required that the receiver 9 be positioned onto the conductive layer 28 such that the conductive portion of the outer surface 52 of the casing 50 in is contact with the conductive layer 28. Accordingly, the electrical component may be conductively connected to the conductive layer 28. Additionally, one electrical component may be conductively connected to another electrical component using the conductive layer 28.

For an example, the conductive layer 28 may be adapted to operate as a common ground and the outer surface 52 of the casing 50 may be connected to the conductive layer 28 to connect the electrical component to the ground. Alternatively, the conductive layer 28 may be adapted to operate as a positive contact and the outer surface 52 of the casing 50 may be connected to the conductive layer 28 to connect the electrical component to a positive contact.

Figure 11:
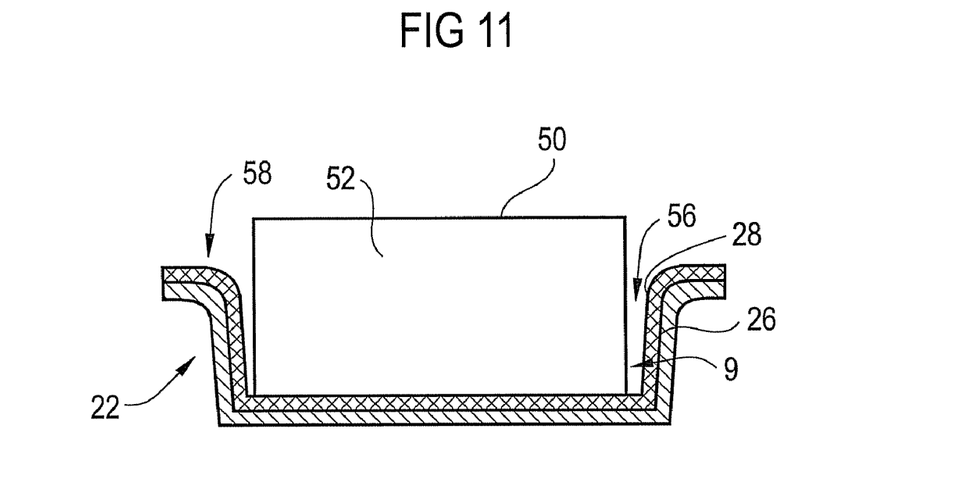
FIG. 11 illustrates a side view of a slot on an inner side of a housing of a hearing aid device according to an embodiment herein, and FIG. 12 with reference to FIGS. 1 through 11 is a flow diagram illustrating a method of producing a hearing aid device according to an embodiment herein.

In an embodiment, the housing 22 may comprise a slot to receive an electrical component, for example the receiver 9. FIG. 11 illustrates a side view of a slot 56 on the inner side 58 of the housing 22. The slot 56 is provided on the inner side 58 of the housing 22. The electrical component when positioned into the slot 56 is conductively connected to the conductive layer 28. The conductive layer 28 may be attached onto a substantial area of the inner surface 26 of the housing 22, including the slot 56. Alternatively, the conductive layer 28 may be attached onto a portion of the inner surface 26 of the housing 22 only within the slot 56.

This enables in reducing the requirement of loose wire leads and thus reduces the electromagnetic interference within the hearing aid device. Additionally, as there is no requirement of soldering, the manufacturing time is reduced and also there is possibility of miniaturizing the hearing aid device as the area covered by a soldering point is substantially large.

Figure 12:
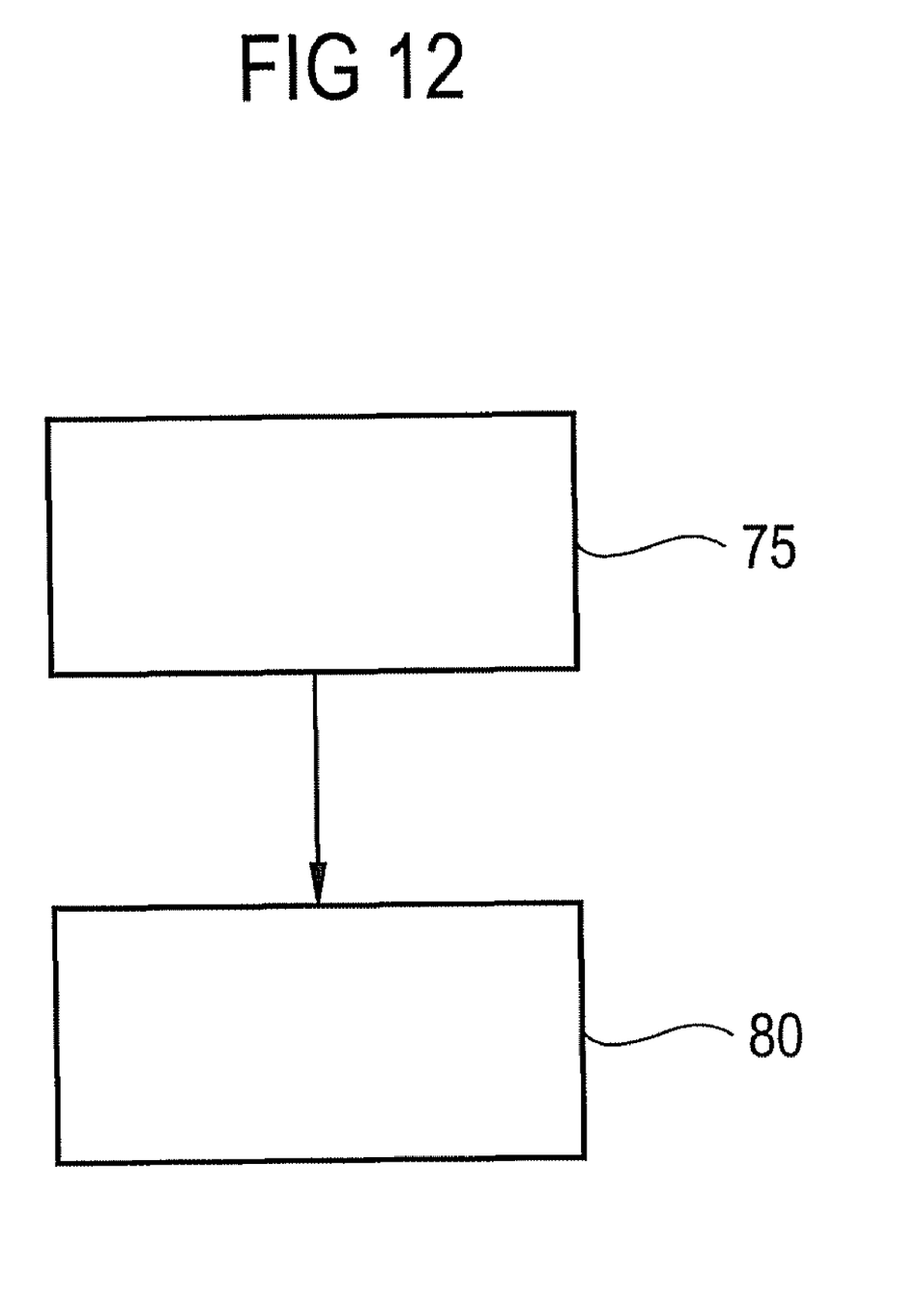

FIG. 12 in reference to FIGS. 1 through 11 is a flow diagram illustrating a method of producing a hearing aid device according to an embodiment herein. At block 75 a conductive layer 28 is attached onto at least a portion of an inner surface 26 of a housing 22 of the hearing aid device 1. The inner surface 26 acts as a support for the conductive layer 28. Advantageously, the conductive layer 28 is attached onto the inner surface 26 of the housing 22 by fabricating the housing 22 and the conductive layers 28 using a solid freeform fabrication technique. The solid freeform fabrication technique includes, but not limited to inkjet printing, pneumatic spraying, screen printing, pad printing, laser printing, dot matrix printing, thermal printing, lithography, and 3D printing. Solid freeform fabrication technique provides the advantages of enabling the manufacturing of the housing 22 and the conductive layer 28 simultaneously. This decreases the manufacturing time of the hearing aid device 1 and also reduces the complexities. Moreover, using solid freeform fabrication technique to manufacture the housing 22 eliminates the requirement for having separate moulds for individual hearing aid device 1 design. However, the housing 22 may be manufactured using other manufacturing techniques such as MID and inset molding. If the hearing aid device is manufactured using a MID or an inset molding technique, a mould may be required to be created for each hearing aid device. Additionally, the manufacturing time of the hearing aid device may be increased as the conductive layer 28 can only be attached after the housing 22 is made.

In a preferred embodiment, the housing 22 and the conductive layers 28 may be fabricated simultaneously using a 3D printing technology. Solid freeform fabrication techniques, such as the 3D printing technology enables fabricating a product using multiple materials. For example, a first printer head may print the non-conductive layer of the housing and a second printer head may print the conductive layers 28 such that the conductive layer 28 is attached onto the inner surface 26 of the housing 22. The printing is done by fabricating layers one after the next successively in physical space until the model or the product is completed.

For example, the housing and the conductive layer 28 may be printed by the respective printer heads by dispersion of suitable respective printing compositions. The printing composition for printing the non-conductive layer may comprise particles of non-conducting elements, for example a resin. The printing composition for printing the conductive layer 28 may comprise particles of conductive elements, such as copper, gold, silver, electrically conductive polymer, and the like. The respective printing compositions for printing the non-conductive layer and the conductive layer 28 may comprise nanoparticles of elements suitable for printing the respective layers. In an alternative embodiment, the face plate 12 and the amplifier 7 may also be printed using respective printer heads by dispersion of suitable respective printing compositions.

Thus, the housing 22 and the conductive layer 28 may be printed simultaneously using freeform fabrication techniques using the respective printing heads. Next at block 80, an electrical component disposed within the housing 22 is conductively connected to the conductive layer 28.

The embodiments described herein enable eliminating loose wire leads required to connect electrical components of a hearing aid device. Additionally, the manufacturing time of the hearing aid device is reduced. Eliminating the need of loose wire leads also enables the electronic component to be inserted independently into the housing during manufacturing of the hearing aid device, and thus eliminating the extra caution required during manufacturing. Moreover, certain embodiments provide a means to suspend the receiver rigidly so that the possibility of the failure of the hearing aid device is reduced. Suspension of the receiver independently enables the receiver to be pushed into position and thus enable easy repairing of the hearing aid device as the defective electrical component may be replaced easily. Additionally, the elimination of loose wire leads enable in reducing the electromagnetic interference within the hearing aid device. Militarization of the hearing aid device is also possible as the requirement of soldering is eliminated.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves, to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

LIST OF REFERENCE SIGNS

1 Hearing aid device
3 Microphone
7 Amplifier
9 Receiver
11 Power source
13 Sound outlet canal
22 Housing
24 Outer surface
26 Inner surface
28 30 Conductive layers
28a-28e Conductive layers
31 Insulating medium
31a-31f Insulating mediums
32 34 Connector leads
36 38 Connector leads
40 Soft ring 42 Conductive medium
44 Connection pad
46 Outer surface of casing
48 Casing
50 Connection pad
52 casing
54 Outer surface of the casing 52
56 Slot
58 Inner side

The invention claimed is:

1. A hearing aid device, comprising:
   a housing comprising an inner surface and an electrical component;
   a conductive layer that is attached on a portion of the inner surface and supported by the inner surface and is conductively connected to the electrical component;
   a second conductive layer; and
   an insulating medium between the conductive layer and the second conductive layer to separate the conductive layer and the second conductive layer,
   wherein the conductive layer extends over at least the portion of the inner surface, and
   wherein the electrical component is conductively connected to the conductive layer by a connector lead to eliminate a soldering, or by a soft ring so that the electrical component is held in a suspended position rigidly and thus reduces a chance of device failure due to shock and vibration.

2. The hearing aid device as claimed in claim 1, wherein the conductive layer is attached on the portion of the inner surface by a solid freeform fabrication technique selected from the group consisting of: an inkjet printing, a pneumatic spraying, a screen printing, a pad printing, a laser printing, a dot matrix printing, a thermal printing, a lithography, and a 3D printing.

3. The hearing aid device as claimed in claim 1, wherein the conductive layer is a conductive pathway.

4. The hearing aid device as claimed in claim 1, wherein the insulating medium is a portion of the inner surface of the housing.

5. The hearing aid device as claimed in claim 1, wherein the insulating medium is an insulating layer.

6. The hearing aid device as claimed in claim 1, wherein the electrical component is conductively connected to another electrical component via the conductive layer.

7. The hearing aid device as claimed in claim 1, wherein the electrical component is fixedly positioned over the conductive layer.

8. The hearing aid device as claimed in claim 1, wherein the conductive layer extends on an outer surface of a casing of the electrical component to conductively connect to a connection pad on the outer surface of the casing.

9. The hearing aid device as claimed in claim 1, wherein the electrical component comprises a casing and a section of the casing comprises a conductive outer surface that contacts with the conductive layer.

10. A method for manufacturing a hearing aid device, comprising:
    attaching a conductive layer onto a portion of an inner surface of a housing of the hearing aid device;
    conductively connecting an electrical component disposed within the housing to the conductive layer,
    attaching a second conductive layer onto the inner surface of the housing; and
    disposing an insulating medium between the conductive layer and the second conductive layer to separate the conductive layer and the second conductive layer,
    wherein the conductive layer extends over at least the portion of the inner surface, and
    wherein the electrical component is conductively connected to the conductive layer by a connector lead to eliminate a soldering, or by a soft ring so that the electrical component is held in a suspended position rigidly and thus reduces a chance of device failure due to shock and vibration.

11. The method as claimed in claim 10, wherein the conductive layer is attached on the portion of the inner surface by a solid freeform fabrication technique selected from the group consisting of: an inkjet printing, a pneumatic spraying, a screen printing, a pad printing, a laser printing, a dot matrix printing, a thermal printing, a lithography, and a 3D printing.

* * * * *